United States Patent [19]
Ferdriksson

[11] 3,781,970
[45] Jan. 1, 1974

[54] METHOD AND A TOOL FOR MOUNTING AND DISMOUNTING SPRING SHOCK ABSORBING MEANS

[75] Inventor: Carl Ewert Ferdriksson, Rimbo, Sweden

[73] Assignee: Domkraft AB Nike, Eskilstuna, Sweden

[22] Filed: Aug. 13, 1971

[21] Appl. No.: 171,581

[30] Foreign Application Priority Data
Aug. 19, 1970 Sweden.............................. 11290/70

[52] U.S. Cl....................... 29/446, 29/238, 29/252, 29/270
[51] Int. Cl............................................ B23p 11/02
[58] Field of Search ...................... 81/3; 267/18, 20, 267/20 A; 280/106.5; 29/200 D, 270, 238, 252, 426, 446; 188/266

[56] References Cited
UNITED STATES PATENTS
2,105,246  1/1938  Horsfield .......................... 267/20 A
3,052,494  9/1962  Williamson ..................... 29/254 UX FOREIGN PATENTS OR APPLICATIONS
303,304  1/1929  Great Britain Primary Examiner—Richard J. Herbst
Assistant Examiner—James R. Duzan
Attorney—Darby & Darby

[57] ABSTRACT

A tool for mounting and dismounting a suspension unit comprising a shock absorber with a surrounding helical spring member in motor cars. On mounting the spring is brought into a protective tube and made to engage an abutment at one end of the tube. A ram acting against one end of the shock absorber is activated and compresses the spring to bring the opposite end of the shock absorber level with the corresponding extremity of the spring so as to allow for connection therewith. On dismounting the opposite steps are taken. In known tools accidents have occurred due to the spring having loosened abruptly during the clamping operation. This danger and other disadvantages are eliminated in the tool according to the present invention.

15 Claims, 4 Drawing Figures

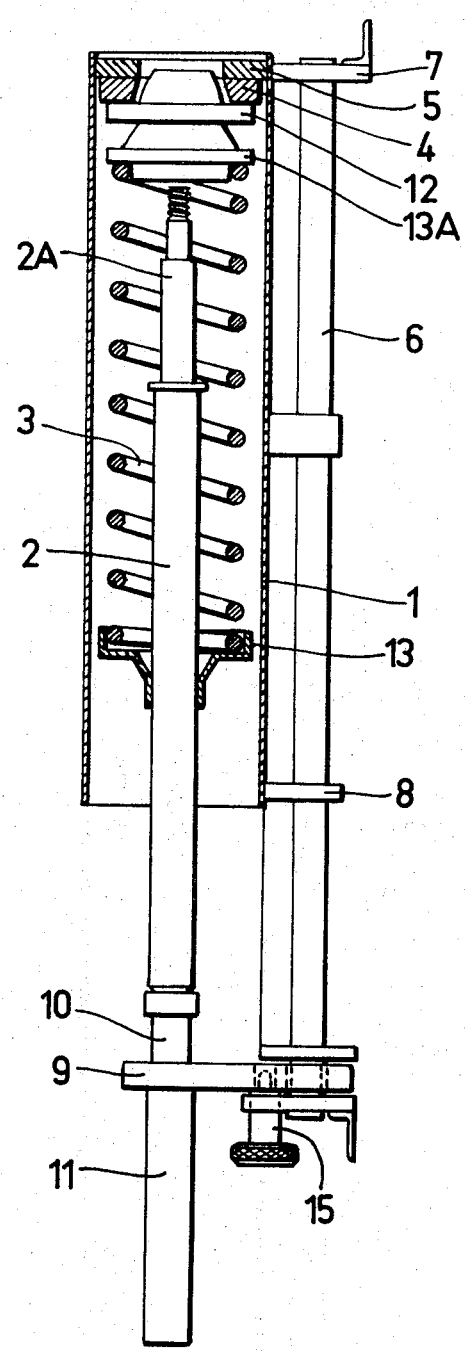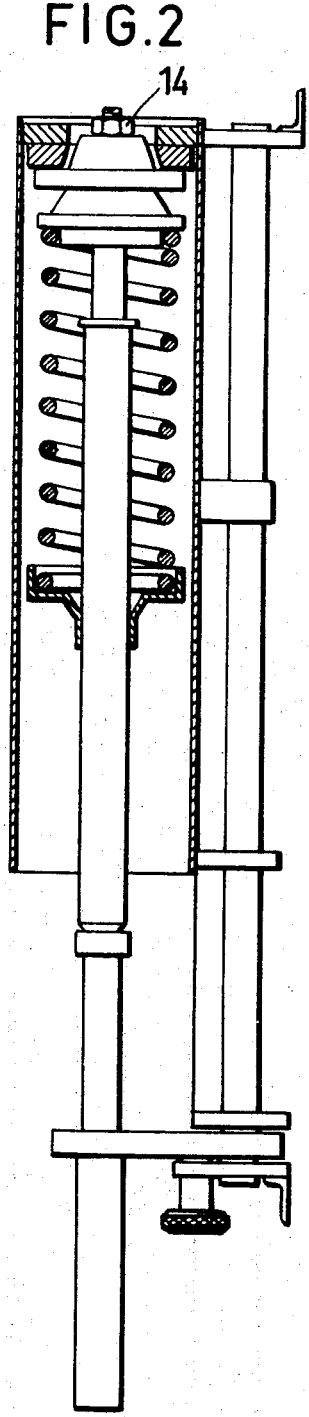

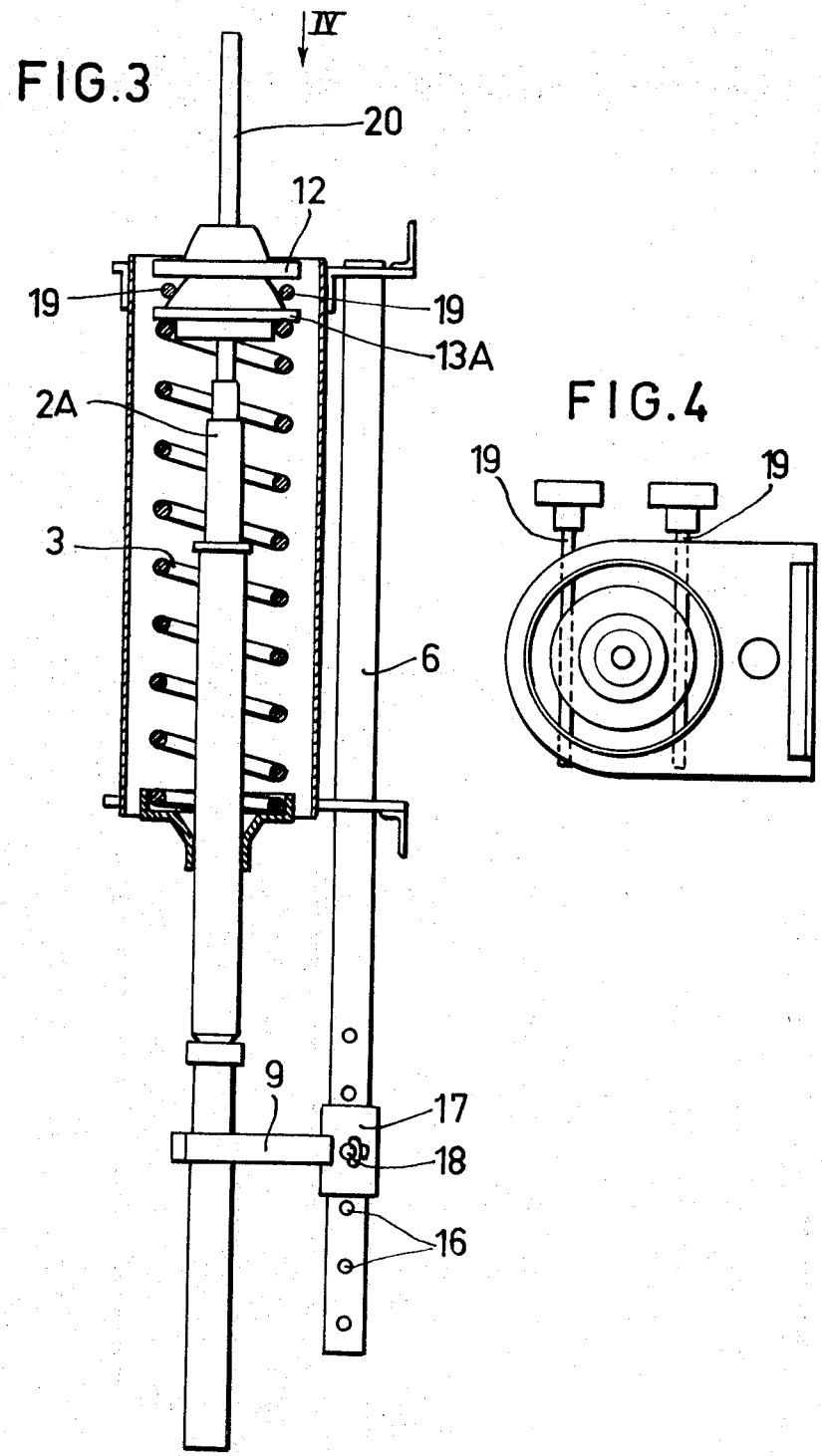

METHOD AND A TOOL FOR MOUNTING AND DISMOUNTING SPRING SHOCK ABSORBING MEANS

This invention relates to a method and a tool for carrying out the method, adapted for mounting and, respectively, dismounting a helical spring and a unit, which is disposed centrally in the spring in the longitudinal direction thereof and comprises a shock absorber and a first and second telescopic element, at such spring shock absorbing means, which are preferably intended for motor cars and at which in assembled state one end of the spring rests against a spring seat of a first member provided on said first element, and the other end of the spring abuts a spring seat of a second member provided detachably on said second element.

The spring shock absorbing means in which the invention is intended to be applied are utilized in the suspension system of certain motor car models. When, for example, the shock absorber unit in such a spring shock absorbing means must be exchanged, then at first the entire spring absorbing means is removed from the car. Thereafter usually the spring is compressed somewhat by a jack means applicable to the spring ends, so that the ends of the spring are separated from their seats whereafter the spring in this compressed state is locked, for example by three clamps spaced about the spring. The spring may then be released from the remaining part of the means, and the work intended may be carried out. The means is thereafter mounted preferably in the reverse manner.

The conventional method of mounting with known tools involves risks from a safety point of view. At certain suspension systems a force of about 600 kp is required to overcome the initial stressing force of the spring and so to compress the spring that the clamps can be attached. A frequent cause of accidents is that the spring suddenly had loosened from the tool during the clamping operation. It was not only the mode of operation of known tools which heretofore has constituted a safety risk, but such risk was also due to the fact that suspension systems of different makes have different dimensions with respect to the spring outer diameter and length causing the tool to improperly fit certain brands of suspension devices.

These disadvantages are eliminated by the method and tool according to the present invention. The method is characterized in that at the mounting operation the second member is attached to stop means at one end of a tubular member, into which the spring in unloaded state and the first and the second element are inserted, whereafter a jack means connected with said tubular member is caused to act at the other end of the tubular member upon the first element to push in said first element and the second element against the second member, that thereafter the second element is connected with said second member, and that at the dismounting operation the aforesaid steps are taken in reverse order. The tool for carrying out the method is characterized in that it comprises a tubular member, into which the spring can be inserted and which at one end is provided with a stop means, which the second member is intended to be brought to abut, and connected with tubular member a jack means adapted at the other end of the tubular member in the direction of the central axis thereof to move the first element against action of the spring.

The spring is permanently under control in the tubular member. Owing to the fact that the forces, which effect the required compression of the spring, act upon the spring via force transfer means, i.e., spring seats, the risk is eliminated that the spring slips aside while being compressed or relieved, contrary to the conventional method at which the tool engages in places which are less well adapted for force transfer. Furthermore, the spring proper when it has been disengaged from the shock absorbing means is safe, because it then is unloaded. The invention renders it possible to carry out the mounting and dismounting much more rapidly than heretofore possible. The mounting time with conventional tools is about 2.5 hours. When using the tool according to the invention, the mounting takes about 15 minutes.

The tool according to the invention, furthermore, is very easy to adapt to suspension systems of different makes.

Embodiments of tools according to the invention are described in the following with reference to the accompanying drawings, in which FIG. 1 in a lateral view and with certain parts by section shows the tool attached to a spring shock absorbing means in which the spring is in unloaded state, FIG. 2 shows the same view as FIG. 1, the spring being in prestressed state and mounted on the shock absorbing means, FIG. 3 shows an embodiment modified with respect to some details, and FIG. 4 shows the view IV according to FIG. 3.

Referring to the Figures, 1 designates a protective tube, which at one end is provided with a stop means in the form of a plate 5 with a central bore. From the tube 1 extend holders 7 and 8, on which a rod 6 extending in parallel with the tube is mounted, which rod at the other end of the tube projects beyond the tube and is provided at its end with an arm 9, to the free end of which is attached a jack means comprising a piston 10 and a cylinder 11. The arm 9 with the jack means 10,11 is mounted rotatably about the central axis of the rod 6 at the end thereof. By a locking device 15 the arm 9 can be locked in a position in which the axis of the jack means coincides with the central axis of tube 1.

In FIG. 1 the tool is shown with an inserted spring 3 and a shock absorber ready for mounting. The shock absorber is of known design with two telescopic elements 2 and 2A. The spring rests at one end against a spring seat 13 secured on the element 2. At the other end of the spring there are provided the second spring seat 13A, which is detachable, and a connecting element 12 between the spring 3 and an insert 4 fitting said element 12. Said insert 4 in its turn abuts the stop means 5. The piston 10 of the jack means is in engagement with the free end of the element 2.

The piston 10 is thereafter pressed upwards whereby the element 2 is pressed upwards and via the spring seat 13 compresses the spring.

In FIG. 2 the mounting operation is completed. The threaded upper end of the element 2A has passed upwardly through the bore in the spring seat 13A and connecting element 12 and has been locked by a nut 14. Thereafter the piston 10 is retracted and the arm 9 swung aside, whereafter the mounted unit can be taken ouf of the tool.

In order to widen the application range of the tool for spring absorbing means of varying length, the arm 9 on the rod 6 preferably is made axially adjustable thereon (see FIG. 3). The rod 6 includes a plurality of transverse holes 16, and the arm 9 is secured on a sleeve 17, which is mounted movably and rotatably on the rod and adapted axially to be locked at the desired hole 16 by a pin 18.

Instead of the details 4 and 5 in FIG. 1, it may be more pratical to utilize a pair of locking pins 19, see FIGS. 3 and 4, which at a suitable place are pushed transversely through the protective tube 1 on both sides of the spring shock absorbing means.

In FIG. 3 it is also shown how the insertion of the end of the shock absorber element 2A into the spring seat 13A and connecting element 12 can be facilitated by a rod 20, which is fastened on the threaded end of the element 2A and thereafter guided in through the hole in the elements 12 and 13A. By means of the rod 20 the element 2A can be held pulled out until its threaded end has passed through the hole in the elements 12 and 13A whereafter the rod 20 can be detached and replaced by the nut 14 shown in FIG. 2. The rod 20 preferably has at least such a length that it projects upwardly with its end above the element 12 when the spring 3 is unloaded and the shock absorber element 2A is inserted.

The invention, of course, is not restricted to the embodiments shown by way of example in the Figures, but the scope of protection is defined by the accompanying claims.

What I claim is:

1. Apparatus for assembling or disassembling a shock absorbing device, which assembled device includes a first elongate element having a first seating member secured thereto, a second elongate element in axial telescoping relationship with said first elongate element having a second seating member removably secured thereto, and a compression spring mounted over said elongate members having a pair of ends engaging respective seating members, comprising:
    an open ended tubular member positionable over said shock absorbing device;
    stop means associated with one end of said tubular member for restraining said second spring seating member from movement in one direction within said tubular member; and
    jack means attached to and adapted to act at the other end of said tubular member for urging said first said first elongate element along the central axis of said second elongate element in order to compress said spring between said first and second seating members and for moving the free end of said second elongate element.

2. A tool according to claim 1, wherein the tubular member has substantially the same length as the spring in unloaded state.

3. Apparatus as recited in claim 1 wherein said stop means for restraining the second spring seating member from movement in one direction includes an exchangeable element for varying the size of the opening in said one end of said tubular member in order to permit the accommodation of various size shock absorbing devices.

4. Apparatus as recited in claim 1 wherein said jack means includes a piston operably mounted within a cylinder positioned adjacent said other tubular member end and along the axis thereof, one end of said piston adapted to engage the free end of said elongate element during operation and to urge said first elongate element along the central axis of said second elongate element.

5. A tool according to claim 4 wherein the jack means in its entirety is axially movable relative to the tubular member.

6. Apparatus as recited in claim 4 further including means for repositioning said jack means out of line with the axis of said tubular member including an extension member fixed to and extending beyond said other end of said tubular member and an arm fixed to said cylinder pivotally mounted to said extension member whrein said jack means is selectively pivotable into and out of line with the central axis of said tubular member.

7. A method for assembling a shock absorbing device, which assembled device includes a first elongate element having a first seating member secured thereto, a second elongate element in axial telescoping relationship with said first elongate element having a second seating member removably secured thereto, and a compression spring mounted over said elongate members having a pair of ends engaging respective seating members, comprising the steps of:
    mounting said spring over said pair of elongate elements so that one end thereof engages said first seating member;
    disposing said second seating member over the free end of said second elongate element;
    urging said first elongate element along the central axis of said second elongate element thereby compressing said spring between said first and second seating members and moving the free end of the second elongate element to a position wherein it may have a member affixed thereto for retaining the second spring seating member; and
    affixing a member to the free end of the second alongate element thereby retaining said second spring seating member.

8. A tool for mounting and dismounting a shock absorber, which shock absorber includes first and second telescopic elements having a helical spring disposed thereover wherein when the shock absorber is assembled, one end of the spring abuts a spring seat defined by a first member provided on said first element and the other end of the spring abuts a spring seat defined by a second member provided detachably on said second element comprising:
    a pair of spaced abutment means defining a space therebetween for receiving at least said spring of said shock absorber, one of said abutment means adapted to serve as an abutment for said second member and the other abutment means adapted to serve as an abutment for said first element; and
    jack means for moving said abutment means relative to each other between a first position wherein said space is receivable of the uncompressed spring and a second position wherein said second element can be connected to said second member.

9. A tool according to claim 8 wherein said one of said abutment means is provided with an exchangeable element for adapting said tool to a variety of shock absorbers.

10. A tool according to claim 8 further including a tubular member receivable of said spring, wherein one end of said tubular member is provided with said one of said abutment means and wherein said jack means is connected at the other end of said tubular member along the central axis thereof.

11. A tool according to claim 10 wherein the tubular member has substantially the same length as the spring in the unloaded state.

12. A tool according to claim 10 wherein the jack means is a hydraulic piston cylinder means aligned along the central axis of the tubular member at the other end thereof.

13. A tool according to claim 10 wherein the jack means is adapted to be swung out of alignment with the central axis of the tubular member by being mounted on an arm supported rotatably about an axis in parallel with said tubular member central axis.

14. A tool according to claim 10 wherein said jack means in its entirety is axially movable relative to the tubular member.

15. A method of mounting and, respectively, dismounting a helical spring and a unit, which unit is disposed centrally in the spring in the longitudinal direction thereof and comprises a shock absorber with a first and a second telescopic element, at such spring shock absorbing means, which are preferably intended for motor cars and at which in assembled state one end of the spring rests against a spring seat of a first member provided on said first element, and the other end of the spring abuts a spring seat of a second member provided detachably on said second element, comprising, in the mounting operation the steps of:

placing the second member with the spring in unloaded state and the first and second elements between two abutment means;

moving said abutment means towards each other by a jack means; and connecting said second element to the second member; reversing the aforesaid steps at the dismounting operation.

* * * * *

PO-1050
(5/69)

UNITED STATES PATENT OFFICE
CERTIFICATE OF CORRECTION

Patent No. 3,781,970     Dated  January 1, 1974

Inventor(s) Carl Ewert Fredriksson

It is certified that error appears in the above-identified patent and that said Letters Patent are hereby corrected as shown below:

On the title page (page 1), directly beneath "United States Patent [19]" change "Ferdriksson" to --Fredriksson--.

Same page, after "[75] Inventor: Carl Ewert" change "Ferdriksson" to --Fredriksson--.

Signed and sealed this 23rd day of April 1974.

(SEAL)
Attest:

EDWARD M.FLETCHER,JR.
Attesting Officer

C. MARSHALL DANN
Commissioner of Patents